3,471,371
STEAM STRIPPING PROCESS WITH RECYCLE WATER AS A SOURCE OF STEAM

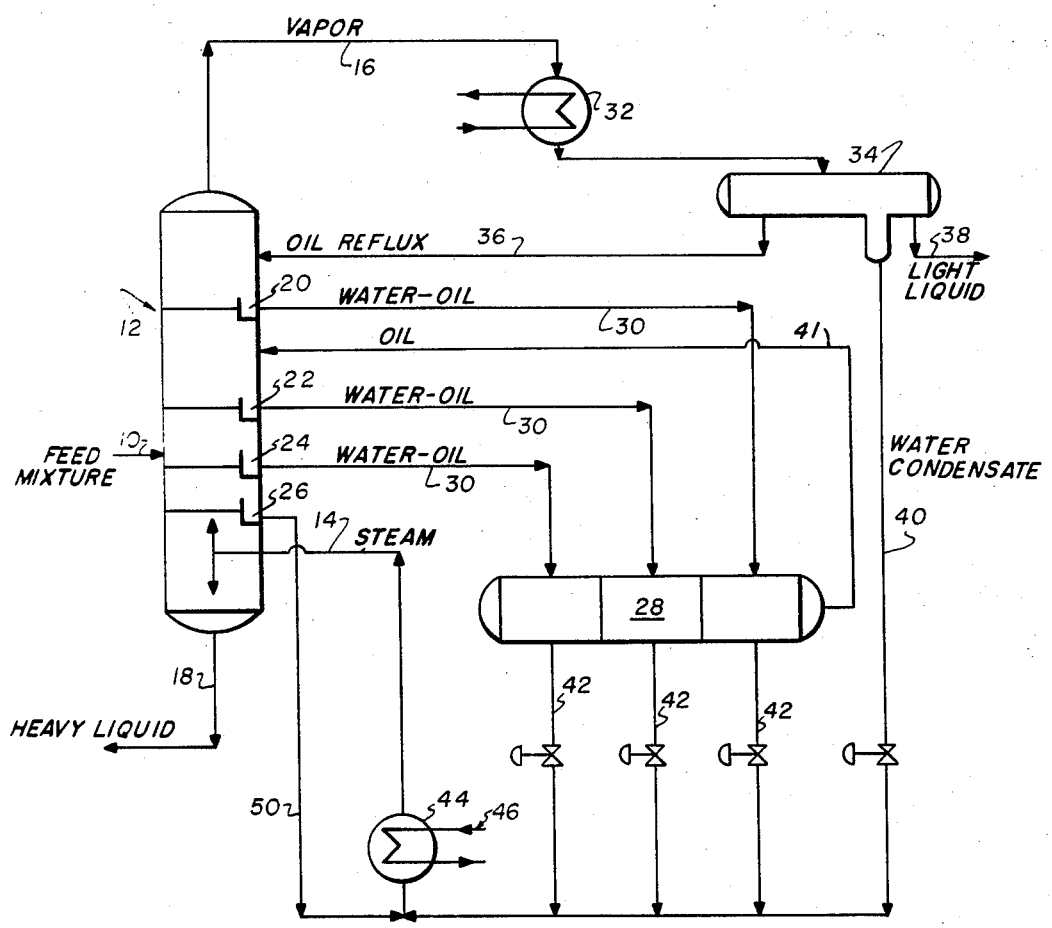

Roland L. Nagy, Caldwell, and Ronald A. Weiss, Parsippany, N.J., assignors to Foster Wheeler Corporation, Livingston, N.J., a corporation of New York
Filed Apr. 25, 1968, Ser. No. 724,084
Int. Cl. B01d 3/38
U.S. Cl. 203—96      2 Claims

ABSTRACT OF THE DISCLOSURE

Mixture of butadiene and heavy oil from an absorber is stripped with steam, reflux is returned, steam condensates passed to oil-water separator, and water from reflux and condensation is collected, recycled and vaporized.

Background of the invention

In the recovery of butadiene from a heavy oil mixture thereof from an absorber, it is customary to subject the mixture to a stripping operation employing steam which permits operation at a lower temperature which is desirable because of the temperature sensitivity of the butadiene. The lower temperature provides a more economical heat usage. The steam is ultimately condensed in the tower, the condensed water collected and then discarded. This requires continuous makeup of steam from an outside source as well as treatment of the discarded water to prevent pollution.

Summary of the invention

According to the present invention, the mixture from the absorber is passed into a tower in which steam is present. Vapor taken off from the top is passed to a condenser and the condensate returned to the tower as reflux. Steam condensed in the tower is passed to an oil-water separator. Water from the reflux drum and from the separator is combined, recycled to the reboiler and vaporized therein. Heaviest oil is drained off at the bottom of the tower.

In the drawing:

Brief description of the drawing

The single figure is a flow diagram of the stripping of a light temperature sensitive liquid from a mixture with a heavier liquid according to the preferred embodiment of the present invention.

Description of the preferred embodiment

The temperature sensitive liquid such as butadiene as mixed with a heavier liquid such as hydrocarbon oil, and as obtained from an absorber, is passed through a feed inlet 10 into a stripper tower 12. This tower is heated by a reboiler 44 receiving heating medium 46 from an external source. The heavy liquid descends to the bottom of the tower 12 and a first stream of heavier liquid is withdrawn through an outlet 18. Intermediate condensates of water containing some entrained oil are collected in trays 20, 22, and 24. The water containing some oil from these trays is passed to an oil-water separator 28 through pipes 30 which also return the oil back to the tower 12 through pipe 41 and produce water through pipes 42.

The vapor from the top of the tower passes through line 16 to a condenser 32 and the liquid therefrom passes through line 17 to reflux drum 34. Oil reflux is returned to the tower through a line 36. The light liquid such as butadiene from the reflux drum 34 passes out through line 38 as the product of the process. Water condensate from the reflux drum 34 passes down through line 40. Water condensate from the oil-water separator 28 passes down through line 42 and is collected with that from the reflux drum 34 through line 40, and recycled to the externally heated reboiler 44. The recycled water condensate is vaporized in the reboiler 44 producing steam which enters the tower through line 14. This steam which is now present in the tower serves to reduce the temperature as required for the stripping operation.

The heavy hydrocarbon liquid from tray 26 forms a second stream of heavier liquid which is passed through line 50 to join the recycled water condensate from lines 40 and 42 to go to the reboiler 44. This heavy liquid is vaporized along with the recycled water and is returned to the tower 12 through line 14.

What is claimed is:
1. A method of stripping a light temperature sensitive liquid from a feed mixture containing a heavier liquid comprising the steps of:
    passing said feed mixture into a fractionating tower;
    stripping said light liquid in the presence of steam such that a portion of the steam is condensed at intermediate points of said tower and the remainder of the steam with said light liquid is passed overhead as a vapor in said tower;
    withdrawing a first stream of the heavier liquid from the bottom of said tower;
    passing said vaporized light liquid and the steam from the tower to a condenser;
    passing the light liquid and water condensate from said condenser into a reflux drum for separating the water and collecting said light liquid as product;
    passing the condensed steam and traces of heavier liquid from said intermediate points of the tower to a separator for separation of said heavier liquid from the water;
    passing a second stream of the heavier liquid from the lower section of said tower to an externally heated reboiler to partially vaporize said heavier liquid;
    recycling the water condensate from said reflux drum and the water from said separator through said reboiler such that said water condensate is vaporized;
    returning the generated steam and partially vaporized liquid to said tower.

2. A method of stripping a light temperature sensitive liquid according to claim 1 in which said light liquid consists of butadiene and said heavier liquid is a hydrocarbon oil.

References Cited
UNITED STATES PATENTS

| | | | |
|---|---|---|---|
| 1,947,817 | 2/1934 | Wallis | 208—353 |
| 2,111,822 | 3/1938 | Sullivan | 203—97 |
| 2,555,939 | 6/1951 | Sherwin | 203—97 |
| 2,905,732 | 9/1959 | Fauske | 260—681.5 |

WILBUR L. BASCOMB, Jr., Primary Examiner

U.S. Cl. X.R.
203—98, 99; 260—681.5